Figure 1:
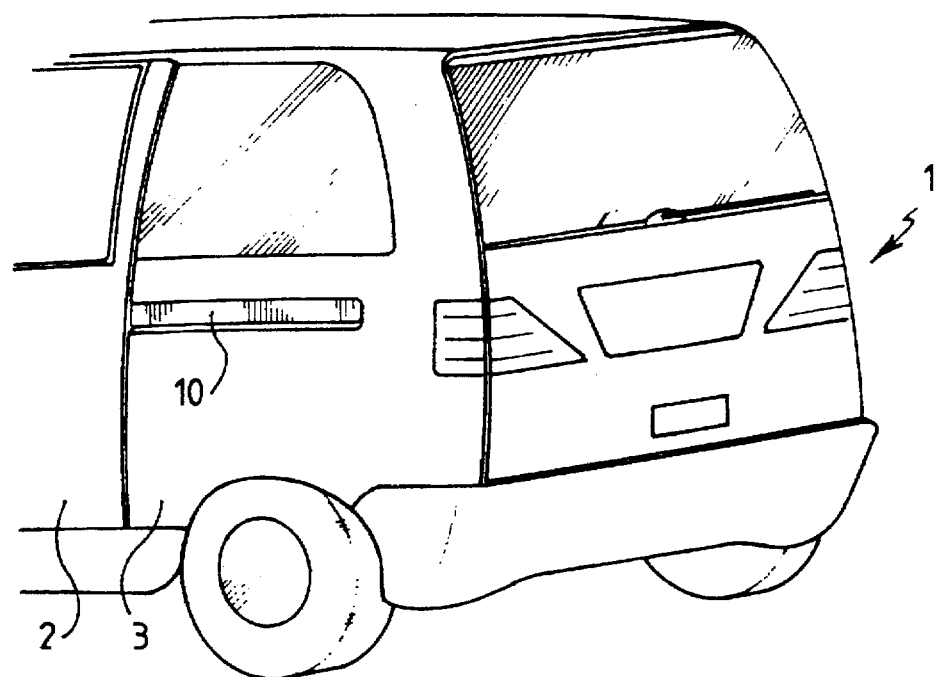

United States Patent [19]
Olivier

[11] Patent Number: 5,676,417
[45] Date of Patent: Oct. 14, 1997

[54] DEVICE FOR PROTECTING A RAIL OF A SLIDING DOOR OF A MOTOR VEHICLE

[75] Inventor: Jamilloux Olivier, Vernouillet, France

[73] Assignees: Automobiles Peugeot, Paris; Automobiles Citroen, Neuilly sur Seine, both of France

[21] Appl. No.: 723,759

[22] Filed: Sep. 30, 1996

[30] Foreign Application Priority Data

Oct. 2, 1995 [FR] France .................... 95 11569

[51] Int. Cl.$^6$ .................................................. B60J 5/06
[52] U.S. Cl. .................................. 296/155; 16/95 R
[58] Field of Search ........................... 296/155; 16/95 R

[56] References Cited

U.S. PATENT DOCUMENTS

| | | | |
|---|---|---|---|
| 4,544,198 | 10/1985 | Ochiai et al. | 296/155 |
| 4,934,023 | 6/1990 | Schubring. | |

FOREIGN PATENT DOCUMENTS

| | | |
|---|---|---|
| 0 357 542 A1 | 3/1990 | European Pat. Off. . |
| 0 544 582 A1 | 6/1993 | European Pat. Off. . |
| 2 234 444 | 1/1975 | France . |
| 1 655 788 | 5/1972 | Germany . |
| 3107434 | 10/1982 | Germany .................... 296/155 |
| 22912 | 2/1982 | Japan .................... 296/155 |

*Primary Examiner*—Gary C. Hoge
*Attorney, Agent, or Firm*—Burns, Doane, Swecker & Mathis, L.L.P.

[57] ABSTRACT

The subject of the invention is a device for protecting a rail of a sliding door of a motor vehicle, the said rail being fitted in a horizontal groove formed in the bodyshell of the vehicle and interacting with members for moving this door, which members can move along the said rail as this door is slid between an open position and a closed position. The device comprises a flap mounted in the groove and pivoted by the said members for moving the door between a substantially horizontal position uncovering the groove when the door is in the open position, and a substantially vertical position filling the said groove when this door is in the closed position.

6 Claims, 3 Drawing Sheets

DEVICE FOR PROTECTING A RAIL OF A SLIDING DOOR OF A MOTOR VEHICLE

The subject of the present invention is a device for protecting a rail of a sliding door of a motor vehicle.

Some motor vehicles are equipped with doors which are mounted so that they can slide along a panel, for example a rear side panel of the vehicle, so as to give complete unencumbered access to the rear seats of this vehicle.

To this end, the sliding doors include at least one runner which is mounted so that it can move along a horizontal rail between a first position in which the door is closed and a second position in which the door is open.

The longitudinal rail for guiding the runner is generally fixed into a horizontal groove formed in the said bodyshell of the vehicle. In this case, a break in continuity of the surface of this panel is visible, and this is particularly visually unappealing.

The object of the invention is to avoid this drawback by providing a device for protecting a rail for guiding a sliding door which makes it possible to conceal the groove created by the fitting of this rail in the bodyshell of this vehicle and to obtain greater uniformity in the overall appearance of the said vehicle.

The subject of the invention is therefore a device for protecting a rail of a sliding door of a motor vehicle, the said rail being fitted in a horizontal groove formed in the bodyshell of the vehicle and interacting with members for moving the door, which members can move along the said rail as this door is slid between an open position and a closed position, characterized in that it comprises a flap mounted in the groove and pivoted by the said members for moving the door between a substantially horizontal position uncovering the groove when the door is in the open position, and a substantially vertical position filling the said groove when this door is in the closed position.

According to other features of the invention:
- the flap is mounted so that it can pivot on at least one pin borne by a lug fixed to the bodyshell of the vehicle inside the groove,
- the flap is returned to the substantially vertical position by at least one elastic element arranged on the said pin,
- the said elastic element consists of a spring,
- the lower edge of the groove is provided with stops for keeping the flap in a substantially vertical position flush with the bodyshell of the vehicle,
- the members for moving the door include at least one finger intended to interact with the internal face of the flap in order to move the said flap between its substantially vertical position and its substantially horizontal position.

Figure 2:
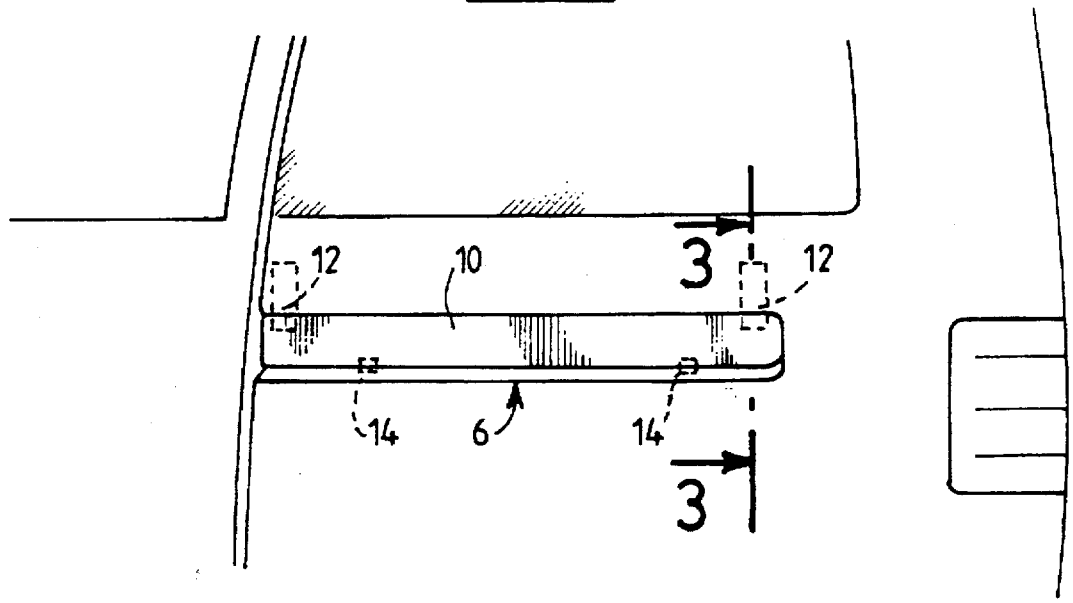
Figure 3:
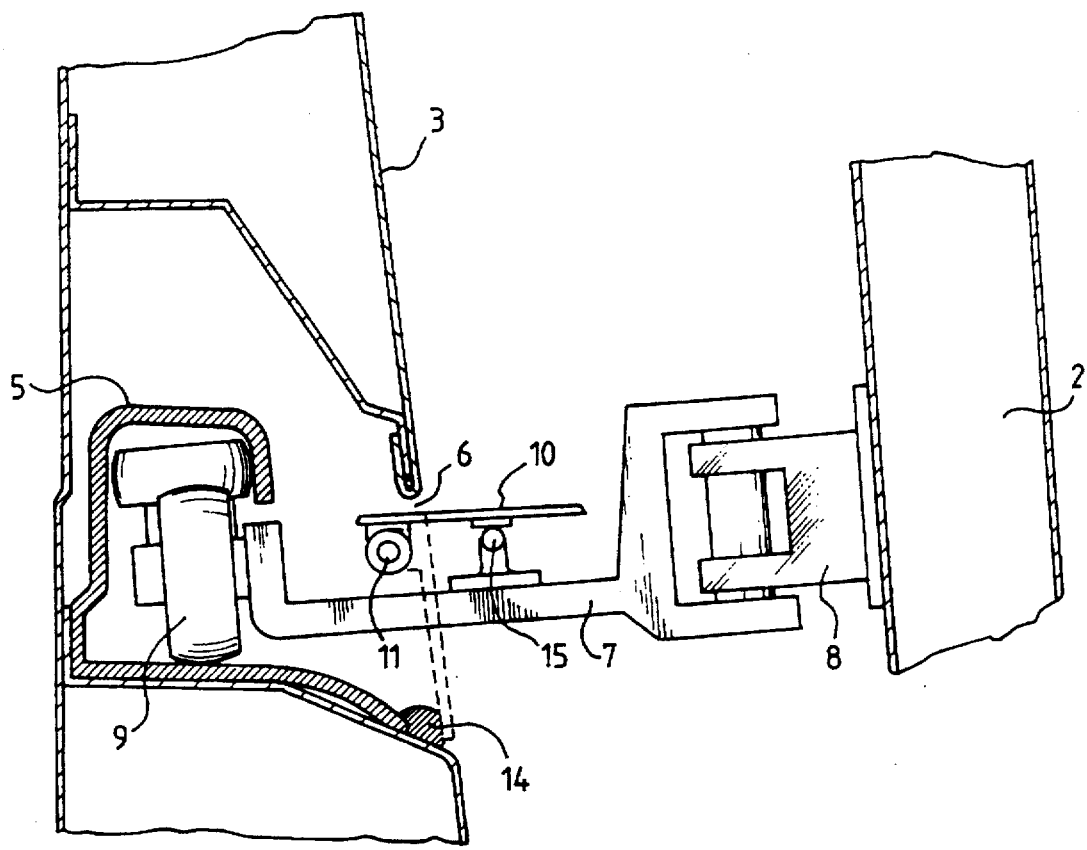
Figure 4:
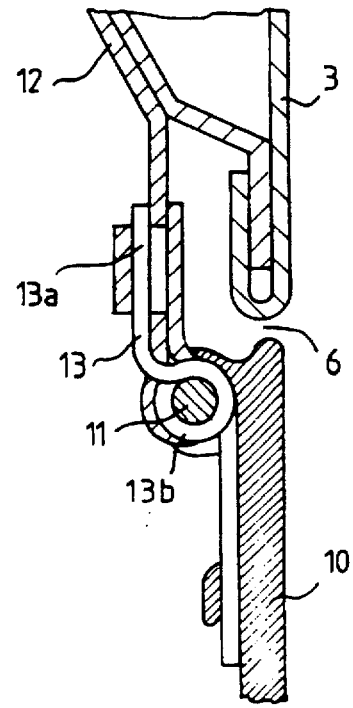

The features and advantages of the invention will become clear during the course of the description which will follow, given solely by way of example and made with reference to the attached drawings, in which:

FIG. 1 is a part view in perspective showing the rear of a motor vehicle equipped with a device for protecting a rail of a sliding door, in accordance with the invention, FIG. 2 is a diagrammatic view on a larger scale of the protection device in accordance with the invention, FIG. 3 is a view in transverse section of the members for moving the sliding door and of the protection device according to the invention, FIG. 4 is a diagrammatic view in section on the line 3—3 of FIG. 2, FIGS. 5 to 7 are diagrammatic plan views showing the kinematics of the sliding door between its closed position and its open position.

FIG. 1 diagrammatically represents the rear part of a motor vehicle 1 equipped with two rear doors 2 which slide parallel to the longitudinal direction of the vehicle 1 along the rear side panels 3 of the bodyshell of the motor vehicle 1.

Just one rear door 2 has been partially represented in FIG. 1, the other rear door being identical.

As represented more particularly in FIG. 3, the rear door 2 is mounted so that it can slide along a rail 5 fitted in a horizontal groove 6 formed in the rear panel 3 of the bodyshell of the motor vehicle 1.

In order to allow the door 2 to move between an open position and a closed position, this door 2 is equipped with support arms 7 which are attached to the said door by a runner 8 and provided at their opposite end to the one connected to this door 2 with rollers 9 interacting with the rail 5 so as to guide the said door 2 as it moves along the rear side panel 3 of the vehicle.

In order to hide the rail 5, the motor vehicle is equipped with a device for protecting this rail which is composed of a flap 10 mounted in the groove 6 and pivoting between a substantially horizontal position (FIG. 4) uncovering the groove 6 when the door is in the open position, and a substantially vertical position (FIG. 3) filling the said groove 6 when this door 2 is in the closed position.

As represented in FIGS. 2 to 4, the flap 10 is mounted so that it can pivot on two pins 11 which are arranged at each end of the said flap 10. Each pin 11 is borne by a lug 12 fixed to the internal face of the rear panel 3 of the motor vehicle 1, that is to say inside the groove 6.

The flap 10 is returned to the substantially vertical position by an elastic element consisting, for example, of a spring 13 mounted on each pin 11. Each spring 13 has a first end 13a attached to the corresponding lug 12 and a second end 13b attached to the corresponding pin 11.

As is clear in FIG. 3, the lower edge of the groove 6 is provided with stops 14, for example made of rubber, which keep the flap 10 in a substantially vertical position flush with the rear panel 3 of the bodyshell of the motor vehicle 1.

The flap 10 is made to pivot between its substantially vertical position and its substantially horizontal position by at least one finger 15 borne by members 7 for moving the door 2. This finger 15 is made of plastic for example.

Figure 5:
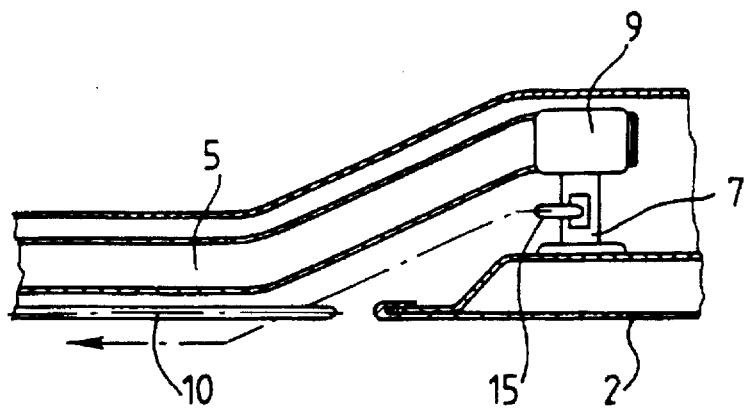

As represented in FIG. 5, when the door 2 is closed, the flap 10 is in the substantially vertical position and is kept in this position by the springs 13, the lower edge of the flap 10 resting against the stops 14.

The flap 10 thus hides the rail 5.

Figure 6:
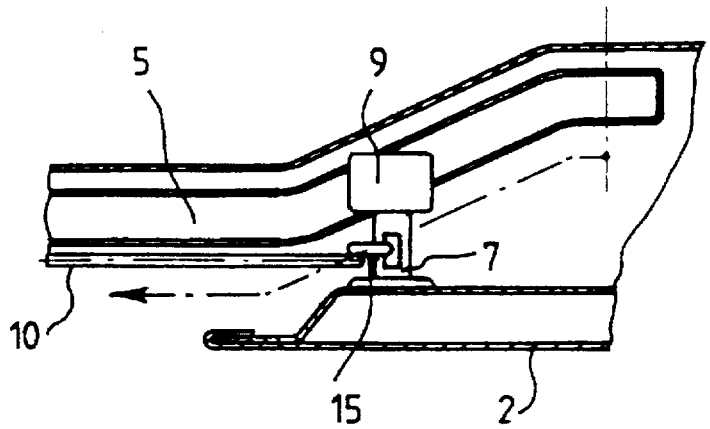
Figure 7:
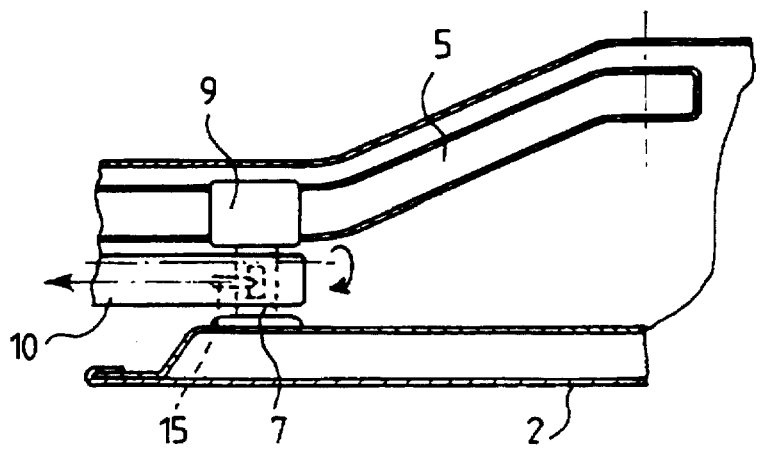

When the door 2 is opened, the rollers 9 roll along the rail 5 and the finger 15 presses against the internal face of the flap 10, which causes this flap 10 to tip about the pins 11 in order to allow the members 7 for moving the door 2 to pass, as represented in FIGS. 6 and 7.

When the door 2 is closed again, the springs 13 bring the flap 10 back into its substantially vertical position flush with the panel 3 of the bodyshell of the motor vehicle 1.

The device according to the invention thus makes it possible to hide the opening created by fitting a rail for guiding a sliding door of a motor vehicle and to have greater uniformity in the overall appearance using a flap in the same colour as the bodyshell of this vehicle.

I claim:

1. Device for protecting a rail of a sliding door of a motor vehicle, the said rail being fitted in a horizontal groove formed in the bodyshell of the vehicle and interacting with members for moving the door, which members can move along the said rail as this door is slid between an open position and a closed position, the device comprising a flap mounted in the groove and pivoted by the said members for moving the door between a substantially horizontal position uncovering the groove when the door is in the open position, and a substantially vertical position filling the said groove when this door is in the closed position.

2. Device according to claim 1, wherein the flap is pivotally mounted on at least one pin borne by a lug fixed to the bodyshell of the vehicle inside the groove.

3. Device according to claim 2, wherein the flap is returned to the substantially vertical position by at least one elastic element arranged on the said pin.

4. Device according to claim 3, wherein the said elastic element consists of a spring.

5. Device according to claim 1, wherein the lower edge of the groove includes stops for keeping the flap in a substantially vertical position flush with the body shell of the vehicle.

6. Device according to claim 1, wherein the members for moving the door include at least one finger operable to interact with an internal face of the flap in order to move the said flap between its substantially vertical position and its substantially horizontal position.

* * * * *